(12) United States Patent
Arpaci et al.

(10) Patent No.: US 9,580,092 B2
(45) Date of Patent: Feb. 28, 2017

(54) METHOD FOR OPERATING A RAIL VEHICLE IN A RAILWAY SYSTEM AND RAILWAY SYSTEM

(71) Applicant: SIEMENS AKTIENGESELLSCHAFT, Munich (DE)

(72) Inventors: Gamze Arpaci, Braunschweig (DE); Wolfgang Bachmann, Braunschweig (DE); Doris Martitz, Meine (DE); Karsten Rahn, Cremlingen (DE)

(73) Assignee: Siemens Aktiengesellschaft, Munich (DE)

( * ) Notice: Subject to any disclaimer, the term of this patent is extended or adjusted under 35 U.S.C. 154(b) by 91 days.

(21) Appl. No.: 14/431,073

(22) PCT Filed: Sep. 10, 2013

(86) PCT No.: PCT/EP2013/068676
§ 371 (c)(1),
(2) Date: Mar. 25, 2015

(87) PCT Pub. No.: WO2014/048718
PCT Pub. Date: Apr. 3, 2014

(65) Prior Publication Data
US 2015/0274182 A1    Oct. 1, 2015

(30) Foreign Application Priority Data

Sep. 27, 2012  (DE) .......................... 10 2012 217 627

(51) Int. Cl.
*B61L 23/00*        (2006.01)
*B61L 23/04*        (2006.01)
(Continued)

(52) U.S. Cl.
CPC ............. *B61L 23/044* (2013.01); *B61L 3/065* (2013.01); *B61L 23/00* (2013.01); *B61L 25/02* (2013.01); *G01H 9/004* (2013.01)

(58) Field of Classification Search
CPC ........ B61L 23/00; B61L 23/002; B61L 23/04; B61L 23/041; B61L 23/044; B61L 3/06;
(Continued)

(56) References Cited

U.S. PATENT DOCUMENTS 5,265,831 A * 11/1993 Muller ...................... B61L 1/06
246/124
5,330,136 A * 7/1994 Colbaugh ................. B61L 1/06
246/122 R (Continued)

FOREIGN PATENT DOCUMENTS

CN          1423605      6/2003
DE          10240272 A9  12/2005
(Continued)

*Primary Examiner* — Jason C Smith
(74) *Attorney, Agent, or Firm* — Laurence Greenberg; Werner Stemer; Ralph Locher

(57) ABSTRACT

A method for operating a rail vehicle in a railway system includes providing at least one optical waveguide which is laid next to at least one railway track and into which light pulses are fed, using the optical waveguide as a distributed acoustic sensor, and detecting backscattered light. In order to configure such a method in such a way that it meets stringent safety requirements relatively easily, a rail vehicle is used having a sound generator which can be adjusted in terms of its frequency spectrum in such a way that it indicates an emergency. When the sound generator is activated, an emergency signal of the rail vehicle is acquired if a frequency spectrum which corresponds to the adjusted emergency frequency spectrum of the sound generator is detected in the backscattered light. A railway system is also provided.

8 Claims, 1 Drawing Sheet

(51) Int. Cl.
*B61L 3/06* (2006.01)
*G01H 9/00* (2006.01)
*B61L 25/02* (2006.01)

(58) Field of Classification Search
CPC ........ B61L 3/065; B61L 25/02; B61L 25/041;
B61L 25/048; G01H 9/00; G01H 9/004
See application file for complete search history.

(56) References Cited

U.S. PATENT DOCUMENTS

| | | | |
|---|---|---|---|
| 6,216,985 B1* | 4/2001 | Stephens | B61K 9/10 |
| | | | 246/120 |
| 6,830,224 B2 | 12/2004 | Lewin et al. | |
| 8,948,550 B2* | 2/2015 | Li | G01K 11/32 |
| | | | 385/12 |
| 9,457,819 B2* | 10/2016 | Ernst | B61L 1/06 |
| 2003/0010872 A1* | 1/2003 | Lewin | B61L 23/041 |
| | | | 246/122 R |
| 2012/0217351 A1* | 8/2012 | Chadwick | B61L 25/021 |
| | | | 246/169 R |
| 2015/0211932 A1* | 7/2015 | Bachmann | B61L 1/20 |
| | | | 374/121 |
| 2015/0274182 A1* | 10/2015 | Arpaci | B61L 3/065 |
| | | | 246/63 R |

FOREIGN PATENT DOCUMENTS

| | | | |
|---|---|---|---|
| WO | 9110584 A1 | 7/1991 | |
| WO | 2011027166 A1 | 3/2011 | |

* cited by examiner

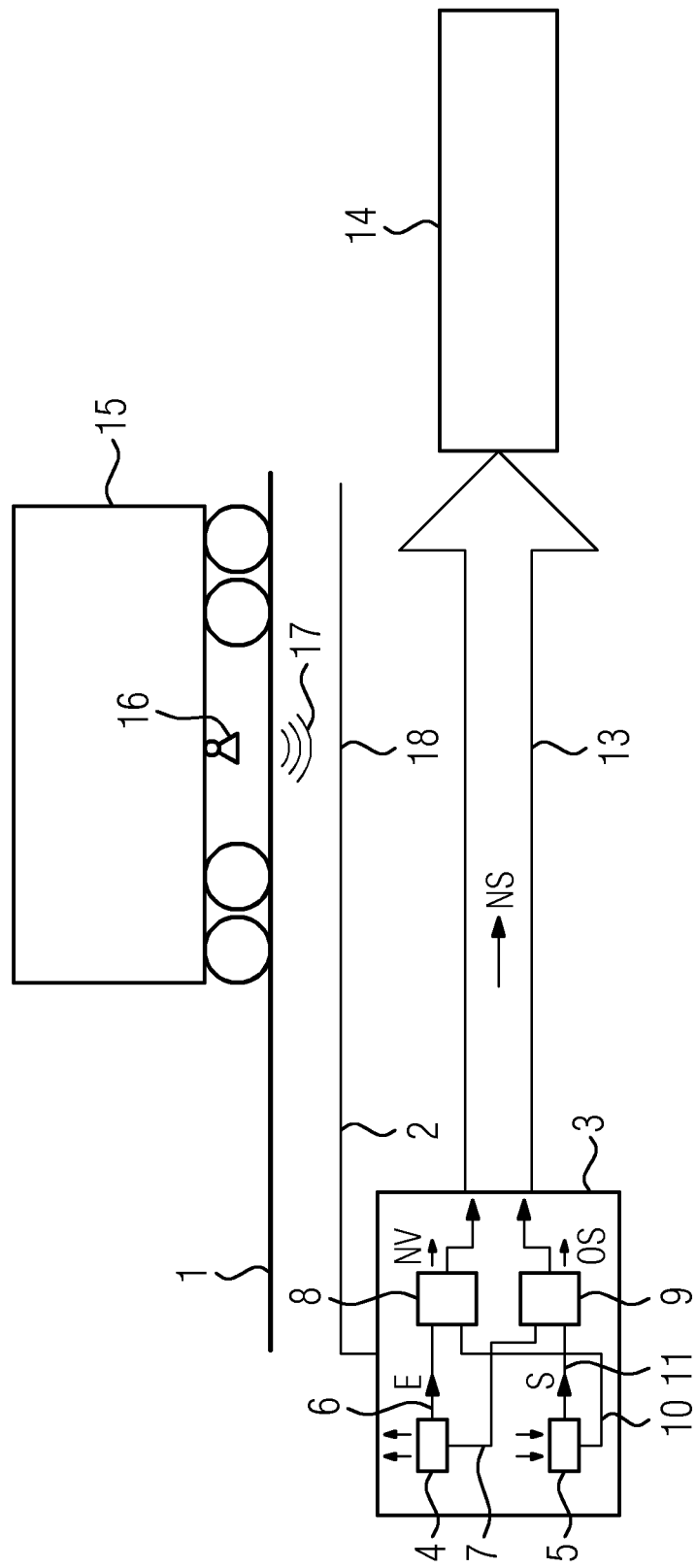

METHOD FOR OPERATING A RAIL VEHICLE IN A RAILWAY SYSTEM AND RAILWAY SYSTEM

BACKGROUND OF THE INVENTION

Field of the Invention

The invention relates to a method for operating a rail vehicle in a railway system having at least one optical waveguide which is laid next to at least one railway track into which light pulses are fed, with said optical waveguide being used as a distributed acoustic sensor and backscattered light being detected.

A method of this type is described in international patent application WO 2011/027166 A1. This known method enables a rail vehicle to be identified and also distinguished from other rail vehicles. Here use is made of the fact that, on moving, each rail vehicle generates a traveling noise which, in terms of its frequency spectrum, is specific for the respective rail vehicle.

The invention is based on the object of disclosing a method for operating a rail vehicle in a railway system which meets stringent safety requirements in a relatively simple way.

BRIEF SUMMARY OF THE INVENTION

To achieve this object, according to the invention, a method of the type disclosed in the introduction is used with a rail vehicle with a sound generator which can be adjusted in terms of its frequency spectrum in such a way that it indicates an emergency and, when the sound generator is activated, an emergency signal of the rail vehicle is acquired if a frequency spectrum which corresponds to the adjusted emergency frequency spectrum is detected in the backscattered light.

A substantial advantage of the method according to the invention consists in the fact that a commonly encountered railway system with a light conductor laid parallel to the railway track offers in a simple way the possibility of transmitting an emergency signal to a track control center. All that is required to this end is the use of a sound generator on the rail vehicle, advantageously a horn, which is adjustable in such a way that it indicates an emergency, and a comparison of the detected frequency spectrum of the backscattered light with a prespecified emergency reference frequency spectrum in order, in the event of conformity of the frequency spectra, to transmit an emergency signal to the track control center using the available communication devices. A further advantage consists in the fact that an emergency signal can always be generated and also transferred in the respective instantaneous position of the rail vehicle on the railway because the generation of an emergency signal does not require emergency call boxes and landline telephones or even mobile telephones, which do not permit message delivery if there is no network coverage.

With one advantageous embodiment of the method according to the invention, an evaluation device, which is exposed on the input side to the light pulses fed-in and the backscattered light, is used which generates a locator signal indicating the location of the activation of the sound generator. An evaluation device of this kind is offered, for example, by the company OptaSense. If the locator signal is also taken into account, the emergency signal is also able to signal the location of the emergency.

With the method according to the invention, it is also advantageous for the emergency signal to be transmitted to a track control center where emergency reactions are triggered.

The invention further relates to a railway system having at least one optical waveguide laid next to at least one railway track as a distributed acoustic sensor to which a light transmitter and a light receiver for backscattered light are assigned.

In order to design a railway system of this kind such that it meets stringent safety requirements in a relatively simple way, the railway system comprises a sound generator, which is adjustable in terms of its frequency spectrum in such a way that it indicates an emergency, and arranged downstream of the light receiver there is an electrical comparator device, which compares the frequency spectrum detected from the backscattered light by the light receiver with the adjusted emergency frequency spectrum and, in the event of conformity, forms an emergency signal for the rail vehicle.

The same advantages may be achieved analogously with the railway system according to the invention as described above in connection with the method according to the invention.

With the railway system according to the invention, the sound generator is preferably a horn.

It is also considered to be advantageous with the railway system according to the invention for a locator device to be connected to the light transmitter and to the light receiver, which generates a locator signal indicating the location of the activation of the sound generator. This locator signal forms with the output signal of the comparator device an emergency signal that not only indicates the emergency per se but also the location of the emergency.

The comparator device of the railway system according to the invention is advantageously communicatively connected to a track control center because this is probably the best place from which to initiate or take corresponding emergency measures.

BRIEF DESCRIPTION OF THE DRAWING

For further explanation of the invention, the FIGURE shows an exemplary embodiment of a railway system according to the invention.

DESCRIPTION OF THE INVENTION

The FIGURE shows a track section 1 of track network of a railway system (not shown in any further detail) with which an optical waveguide 2 is laid in parallel. A light-transmitting and evaluation device 3 containing a light transmitter 4 and a light receiver 5 is connected to the optical waveguide 2. The light transmitter 4 is connected by lines 6 and 7 to both a comparator device 8 and a locator device 9. Correspondingly, the light receiver 5 is connected on the output side by further lines 10 and 11 to the comparator device 8 and the locator device 9. The light-transmitting and evaluation device 3 is connected by a bus connection 13 to a track control center 14.

In the exemplary embodiment shown, a rail vehicle 15 provided with a sound generator 16 in the form of a horn is located on the railway track 1.

If, in an emergency, the driver of the rail vehicle 15 actuates the sound generator 16, the sound generator emits a sound signal 17 with a frequency spectrum indicating an emergency. This sound signal 17 influences the optical waveguide 2 such that it causes back-scattering of the light emitted by the light transmitter 4 in the region 18 of the impinging sound signal 17. The backscattered light is detected in the light receiver 5 and a signal S is generated with a frequency spectrum corresponding to the frequency spectrum of the sound signal 17. In the comparator device 6, the signal S is compared to an electrical signal E with a frequency spectrum that, in the event of an emergency, corresponds to the adjusted emergency frequency spectrum of the light transmitter 4. In the event of the signal S conforming in terms of its frequency spectrum with the emergency frequency spectrum, a preliminary emergency signal NV is generated.

In addition, a locator signal OS containing information on the position of the rail vehicle when the sound generator 16 is activated is formed in the locator device 9. The preliminary emergency signal NV is transmitted together with the locator signal OS with the formation of an emergency signal NS via the bus 13 to the track control center 14 where it is detected as an emergency message. The track control center is able to derive corresponding reactions therefrom.

The invention claimed is:

1. A method for operating a rail vehicle in a railway system, the method comprising the following steps:
    providing at least one optical waveguide laid next to at least one railway track;
    feeding light pulses into the at least one optical waveguide as a distributed acoustic sensor;
    detecting backscattered light;
    adjusting a frequency spectrum of a sound generator of a rail vehicle to indicate an emergency; and
    upon activating the sound generator, acquiring an emergency signal of the rail vehicle if a frequency spectrum corresponding to the adjusted emergency frequency spectrum of the sound generator is detected in the backscattered light.

2. The method according to claim 1, which further comprises using a horn as the sound generator.

3. The method according to claim 1, which further comprises using a light-transmitting and evaluating device having an input side exposed to the fed-in light pulses and the backscattered light to determine a location of activation of the sound generator.

4. The method according to claim 1, which further comprises transmitting the emergency signal to a track control center where emergency reactions are triggered.

5. A railway system, comprising:
    at least one optical waveguide laid next to at least one railway track as a distributed acoustic sensor;
    a light transmitter and a light receiver for backscattered light being associated with said at least one optical waveguide;
    a sound generator having a frequency spectrum being adjustable to indicate an emergency; and
    an electrical comparator device disposed downstream of said light receiver and configured to compare a frequency spectrum detected from the backscattered light by said light receiver with the adjusted emergency frequency spectrum of said sound generator and to form an emergency signal of the rail vehicle upon conformity therebetween.

6. The railway system according to claim 5, which further comprises a locator device connected to said light transmitter and to said light receiver and generating a locator signal indicating a location of an activation of said sound generator.

7. The railway system according to claim 5, wherein said sound generator is a horn.

8. The railway system according to claim 5, which further comprises a light-transmitting and evaluating device having said light transmitter and said light receiver, and a track control center communicatively connected to said light-transmitting and evaluating device.

* * * * *